United States Patent
Russo

(10) Patent No.: US 10,430,638 B2
(45) Date of Patent: Oct. 1, 2019

(54) SYSTEMS AND METHODS FOR SPOOF DETECTION RELATIVE TO A TEMPLATE INSTEAD OF ON AN ABSOLUTE SCALE

(71) Applicant: Synaptics Incorporated, San Jose, CA (US)

(72) Inventor: Anthony P. Russo, New York, NY (US)

(73) Assignee: Synaptics Incorporated, San Jose, CA (US)

(*) Notice: Subject to any disclaimer, the term of this patent is extended or adjusted under 35 U.S.C. 154(b) by 154 days.

(21) Appl. No.: 15/388,586

(22) Filed: Dec. 22, 2016

(65) Prior Publication Data

US 2018/0129858 A1    May 10, 2018

Related U.S. Application Data

(60) Provisional application No. 62/420,513, filed on Nov. 10, 2016.

(51) Int. Cl.
   *G06K 9/00* (2006.01)
   *G06K 9/62* (2006.01)

(52) U.S. Cl.
   CPC ..... *G06K 9/00087* (2013.01); *G06K 9/00107* (2013.01); *G06K 9/00899* (2013.01); *G06K 9/00926* (2013.01); *G06K 9/6202* (2013.01)

(58) Field of Classification Search
   None
   See application file for complete search history.

(56) References Cited

U.S. PATENT DOCUMENTS

| | | | |
|---|---|---|---|
| 7,505,613 B2 | 3/2009 | Russo | |
| 8,090,163 B2* | 1/2012 | Schuckers | G06K 9/00114 382/125 |
| 8,437,513 B1* | 5/2013 | Derakhshani | G06K 9/00597 382/115 |
| 9,400,916 B1* | 7/2016 | Brownlee | A61B 5/1172 |
| 9,672,341 B2* | 6/2017 | Danikhno | G06F 16/00 |
| 9,721,086 B2* | 8/2017 | Shear | G06F 21/45 |

(Continued)

FOREIGN PATENT DOCUMENTS

KR    10-2011-0014758 A    2/2011

OTHER PUBLICATIONS

Security issues in biometric authentication, Qinghan Xiao, 2005, IEEE, pp. 8-13.*

(Continued)

*Primary Examiner* — Jayesh A Patel
(74) *Attorney, Agent, or Firm* — Leydig, Voit & Mayer, Ltd.

(57) ABSTRACT

Disclosed are a system and method for performing spoof detection. The method includes: receiving, by a processor from a biometric sensor, an input image of a biometric; extracting, by the processor, one or more anti-spoof metrics from the input image; receiving, by the processor, an anti-spoof template corresponding to the biometric; for a first anti-spoof metric, computing, by the processor, a differential value between a value of the first anti-spoof metric extracted from the input image and a value of the first anti-spoof metric in the anti-spoof template; and determining, by the processor, whether the input image is a replica of the biometric based on the differential value.

18 Claims, 6 Drawing Sheets

(56) References Cited

U.S. PATENT DOCUMENTS

| | | | | |
|---|---|---|---|---|
| 9,842,245 | B1* | 12/2017 | Setterberg | G06K 9/0012 |
| 10,121,054 | B2* | 11/2018 | Krishnapura | G06K 9/00087 |
| 2003/0115490 | A1* | 6/2003 | Russo | G06K 9/00026 |
| | | | | 726/5 |
| 2007/0014443 | A1* | 1/2007 | Russo | G06K 9/00114 |
| | | | | 382/124 |
| 2007/0268485 | A1* | 11/2007 | Polonskiy | A61B 5/0059 |
| | | | | 356/300 |
| 2008/0025580 | A1 | 1/2008 | Sidlauskas et al. | |
| 2009/0316963 | A1 | 12/2009 | Boshra | |
| 2010/0131273 | A1 | 5/2010 | Aley-Raz et al. | |
| 2011/0157347 | A1* | 6/2011 | Kalocsai | H04N 7/183 |
| | | | | 348/78 |
| 2011/0234631 | A1* | 9/2011 | Kim | G06T 15/60 |
| | | | | 345/632 |
| 2012/0070043 | A1* | 3/2012 | Higuchi | A61B 5/1172 |
| | | | | 382/124 |
| 2012/0237091 | A1 | 9/2012 | Nakamura | |
| 2013/0212655 | A1* | 8/2013 | Hoyos | G06K 9/00107 |
| | | | | 726/5 |
| 2013/0259330 | A1* | 10/2013 | Russo | G06K 9/00087 |
| | | | | 382/124 |
| 2014/0037156 | A1* | 2/2014 | Cavallini | G06K 9/629 |
| | | | | 382/118 |
| 2014/0294262 | A1* | 10/2014 | Schuckers | G06K 9/00114 |
| | | | | 382/125 |
| 2014/0337930 | A1* | 11/2014 | Hoyos | H04L 63/10 |
| | | | | 726/4 |
| 2015/0206538 | A1* | 7/2015 | Aviles-Casco | G10L 17/00 |
| | | | | 704/246 |
| 2015/0324629 | A1* | 11/2015 | Kim | G06K 9/00228 |
| | | | | 382/203 |
| 2016/0019421 | A1* | 1/2016 | Feng | G06K 9/00604 |
| | | | | 382/117 |
| 2016/0063300 | A1* | 3/2016 | Du | G06K 9/00033 |
| | | | | 382/124 |
| 2016/0070967 | A1* | 3/2016 | Du | G06K 9/00093 |
| | | | | 382/124 |
| 2016/0350573 | A1* | 12/2016 | Kitchens, II | G06K 9/0002 |
| 2016/0379037 | A1* | 12/2016 | Russo | G06K 9/00114 |
| | | | | 382/125 |
| 2018/0060648 | A1* | 3/2018 | Yoo | G06K 9/00228 |
| 2018/0129859 | A1* | 5/2018 | Krishnapura | G06K 9/00899 |
| 2018/0129860 | A1* | 5/2018 | Krishnapura | G06K 9/00906 |

OTHER PUBLICATIONS

Spoofing and Anti-Spoofing measures, Seephanie A.C Schuckers, Elsevier, 2002, pp. 56-62.*

Information fusion in biometrics, Arun Ross et al., Elsevier, 2003, pp. 2115-2125.*

Security issues in biometric authentication, Qinghan Xiao, 2005, IEEE, pp. 8-13 (Year: 2005).*

Spoofing and Anti-Spoofing measures, Seephanie A.C Schuckers, Elsevier, 2002, pp. 56-62 (Year: 2002).*

Information fusion in biometrics, Arun Ross et al., Elsevier, 2003, pp. 2115-2125 (Year: 2003).*

Mair, et al. "Adaptive and Generic Corner Detection Based on the Accelerated Segment Test," Proceeding ECCV'10, Proceedings of the 11th European Conference on Computer Vision: Part II, Heraklion, Crete, Greece, pp. 183-196 (Sep. 5-11, 2010).

Leutenegger, et al. "BRISK: Binary Robust Invariant Scalable Keypoints," 2011 IEEE International Conference on Computer Vision (ICCV) (Nov. 6-13, 2011).

Ojala, et al. "Multiresolution Gray Scale and Rotation Invariant Texture Classification with Local Binary Patterns," IEEE Transactions on Pattern Analysis and Machine Intelligence, vol. 24, Iss. 7, pp. 971-987 (Jul. 2002).

Dalal, et al. "Histograms of Oriented Gradients for Human Detection," IEEE Computer Society Conference on Computer Vision and Pattern Recognition 2005 (CVPR 2005) (Jun. 20-25, 2005).

Fisher, Bob. "Derivatives and Gradients" (Dec. 17, 1997) (available at: http://homepages.inf.ed.ac.uk/rbf/CVonline/LOCAL_COPIES/BASICMAT/node5.html).

Ghiani, et al. "Experimental Results on Fingerprint Liveness Detection," Proceeding AMDO '12, Proceedings of the 7th international conference on Articulated Motion and Deformable Objects, Mallorca, Spain, pp. 210-218 (Jul. 11-13, 2012).

Gottschlich, et al. "Fingerprint Liveness Detection based on Histograms of Invariant Gradients," 2014 IEEE International Joint Conference on Biometrics (IJCB) (Sep. 29-Oct. 2, 2014).

Wikipedia, "Image Gradient," as last modified on Sep. 15, 2016.

Pietikäinen, Matti. "Local Binary Patterns," Scholarpedia, vol. 5, No. 3 (2010).

Gragnaniello, et al. "An investigation of local descriptors for biometric spoofing detection," IEEE Transactions on Information Forensics and Security, vol. 10, Iss. 4, pp. 849-863 (2015).

Decann, et al. "A Novel Region Based Liveness Detection Approach for Fingerprint Scanners," Proceeding ICB '09, Proceedings of the Third International Conference on Advances in Biometrics, Alghero, Italy, pp. 627-636 (Jun. 2-5, 2009).

Ghiani, Luca, et al. "LivDet 2013 fingerprint liveness detection competition 2013." *2013 International Conference on Biometrics (ICB)*. IEEE, 2013.

Mura, Valerio, et al. "LivDet 2015 fingerprint liveness detection competition 2015." *Biometrics Theory, Applications and Systems (BTAS), 2015 IEEE 7th International Conference on*. IEEE, 2015.

International Search Report and Written Opinion in PCT/US2017/061150 dated Feb. 6, 2018 (14 pages).

International Preliminary Report on Patentability and Written Opinion in International Patent Application No. PCT/US2017/061150 dated May 23, 2019.

* cited by examiner

SYSTEMS AND METHODS FOR SPOOF DETECTION RELATIVE TO A TEMPLATE INSTEAD OF ON AN ABSOLUTE SCALE

CROSS-REFERENCE TO RELATED APPLICATIONS

This application claims the benefit of U.S. Provisional Application No. 62/420,513, filed on Nov. 10, 2016, which is hereby incorporated by reference in its entirety.

FIELD

This disclosure generally relates to biometric sensors and, more particularly, to systems and methods for spoof detection relative to a template instead of on an absolute scale.

BACKGROUND

Biometric authentication systems are used for authenticating and/or verifying users of devices incorporating the authentication systems. Biometric sensing technology provides a reliable, non-intrusive way to verify individual identity for recognition purposes.

Fingerprints, like various other biometric characteristics, are based on distinctive personal characteristics and are, thus, a reliable mechanism for recognizing an individual. There are many potential applications for using fingerprint sensors. For example, fingerprint sensors may be used to provide access control in stationary applications, such as security checkpoints. Electronic fingerprint sensors may also be used to provide access control in mobile devices, such as cell phones, wearable smart devices (e.g., smart watches and activity trackers), tablet computers, personal data assistants (PDAs), navigation devices, and portable gaming devices. Accordingly, some applications, in particular applications related to mobile devices, may require authentication systems that are both small in size and highly reliable.

Biometric "spoofing" is any attempt to circumvent biometric security using a replica of a user's sensed biometric. In the context of fingerprint authentication systems, some examples of spoofing materials include a three-dimensional (3D) gelatin mold of a finger, a graphite mold of a finger, a wood glue mold of a finger, and printed two-dimensional (2D) image of a finger, among others. In the context of facial recognition, an example spoofing material could be a photo of person's face. In the context of voice recognition, an example spoofing material could be a vocal imitation or playback.

In order to maintain the integrity of biometric authentication systems, there is a need for anti-spoofing systems and methods, also referred to as "liveness detection", that can detect when an authentication attempt is a spoof and, upon spoof detection, properly deny authentication.

SUMMARY

One embodiment a device, comprising a biometric sensor and a processing system. The processing system is configured to: receive, from the biometric sensor, an input image of a biometric; extract one or more anti-spoof metrics from the input image; receive an anti-spoof template corresponding to the biometric; for a first anti-spoof metric, compute a differential value between a value of the first anti-spoof metric extracted from the input image and a value of the first anti-spoof metric in the anti-spoof template; and, determine whether the input image is a replica of the biometric based on the differential value.

Another embodiment provides a method for performing spoof detection. The method includes: receiving, by a processor from a biometric sensor, an input image of a biometric; extracting, by the processor, one or more anti-spoof metrics from the input image; receiving, by the processor, an anti-spoof template corresponding to the biometric; for a first anti-spoof metric, computing, by the processor, a differential value between a value of the first anti-spoof metric extracted from the input image and a value of the first anti-spoof metric in the anti-spoof template; and determining, by the processor, whether the input image is a replica of the biometric based on the differential value. Some embodiments further include a non-transitory computer-readable storage medium storing instructions that, when executed by a processor, perform the method for spoof detection.

DETAILED DESCRIPTION

Figure 1:
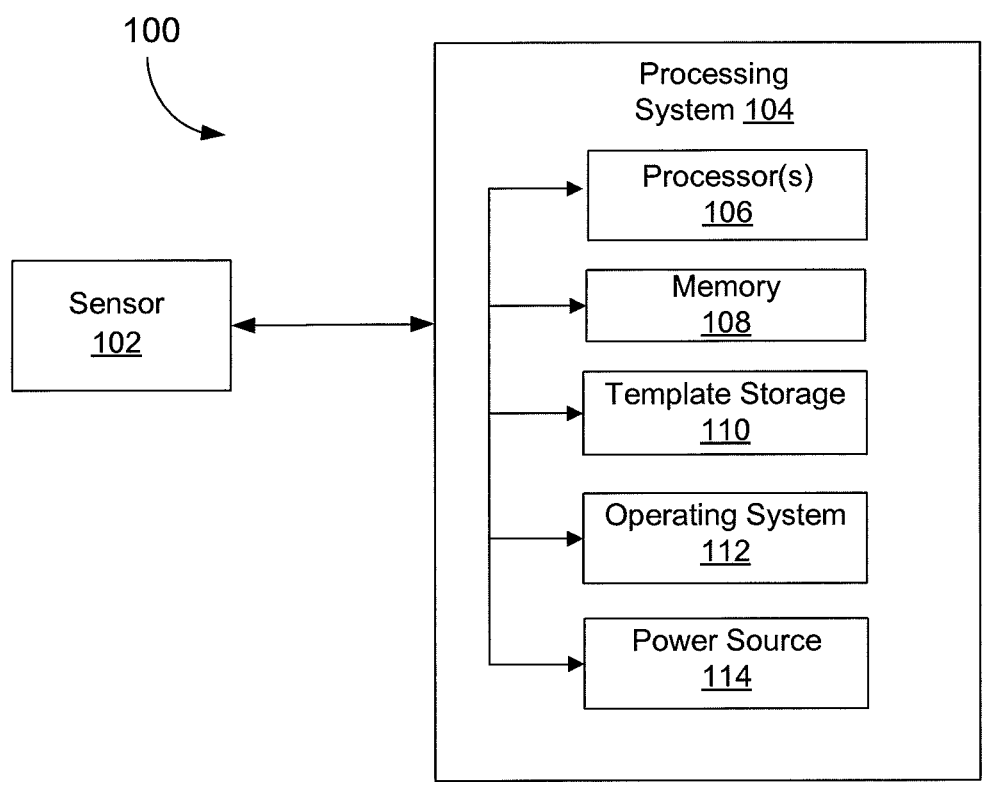
FIG. 1 is a block diagram of an example of an electronic device that includes a sensor device and a processing system, according to an embodiment.

The following detailed description is merely exemplary in nature and is not intended to limit the disclosure or the application and uses of the disclosure. Furthermore, there is no intention to be bound by any expressed or implied theory presented in the preceding technical field, background, summary, brief description of the drawings, or the following detailed description. Turning to the drawings, and as described in greater detail herein, embodiments provide systems and methods for a metric for spoof detection.

Fingerprint images can have considerable variation from person to person, from sensor to sensor, and even from different images for the same person. This variation reflects the fact that a person's finger is a living thing and changes as the finger responds to external factors, such as sweating, stretching when touched, etc. When a finger is imaged with a fingerprint sensor, these changes are captured to some extent and, hence, the sensed images include some variation, even with different impressions of the same finger. Also, different sensors from the same sensing technology can add small differences.

The goal of a robust fingerprint matcher is to be agnostic to many of these changes for the same finger, which improves the usability of the system for a genuine user. However, if spoofs are constructed, e.g., with latent prints from the user, the spoof images can be sufficiently similar to the real finger that they can be used to gain entry into the system. Fingerprint anti-spoof technology attempts to distinguish images from spoof fingers from those of live fingers by deriving properties from the images that can be used to differentiate them.

As described, anti-spoof technology helps to improve the security of a biometric authentication system by preventing a successful authentication using a spoofed fingerprint, for example a spoof fingerprint created using the latent fingerprint of a genuine user of the device. Since the spoof fingerprint is a copy of the fingerprint that is enrolled on the device, without anti-spoof technology, a fingerprint matcher could match the spoofed fingerprint image to an enrolled image and grant access to the device.

Anti-spoof technology analyzes features in the spoof fingerprint image and attempts to distinguish the spoof fingerprint image from an image of a real finger. Embodiments of the disclosure provide a system and method for spoof detection based on computing one or more metrics that are relative to prior images of the same biometric.

Once the one or more metrics are computed, the metrics are input to a "classifier," which produces a score that can be compared against a threshold to determine if the finger is a live finger or a spoof. In some implementations, many different metrics are input into the classifier, and the classifier is configured to compute an overall liveness score based on the combination of metrics. In one example, the classifier is a neural network, but any classifier is within the scope of the disclosure. The classifier itself can be developed using machine learning methods, where a training set and a test set are created to train and validate the classifier performance.

Software-based anti-spoof technology detects spoofs by extracting features in an input image and analyzing those features to distinguish a spoof image from an image of a real finger. In some embodiments, anti-spoof solutions are performed independent of the underlying matcher (i.e., the matcher that is used to determine whether the input image provides a match to an enrollment template (or "enrollment image") for purposes of authentication, verification, or identification, for example), such that a match/non-match decision and a spoof/non-spoof decision are made separately and independently of one another.

Some anti-spoof classification systems attempt to determine the degree to which any given finger appears to be live, as opposed to a spoof. Typically, an anti-spoof classification system uses an absolute scale and classifies the degree to which any given finger appears to be live using populations/distributions of all live and spoof examples in a training database. In other words, these conventional approaches rely on absolute metrics when making a liveness determination.

In other conventional systems, a liveness score is computed for each enrollment image for a user based on extracting anti-spoof metrics from each enrollment image during the enrollment process and combining the metrics in some manner (e.g., via a liveness classifier). The liveness scores for the different enrollment images can be combined, for example by averaging, into an overall liveness score for the user. When a verification attempt is made, such conventional systems extract anti-spoof metrics from an input image associated with the verification attempt and then compute a liveness score for the input image based on the combination of metrics. The liveness score associated with the verification attempt can be compared to the overall liveness score for the user to determine if it is a spoof. For example, a determination can be made as to whether the difference between the liveness score associated with the verification attempt and the overall liveness score is within a threshold. However, this method is merely sets the classifier threshold in a relative way. It does not modify the classifier itself at all and none of the metrics input into the classifier are differential metrics.

Embodiments make a liveness determination based on metrics (e.g., statistics) that are relative to metrics found in other images of that particular user's finger. The relative differences in the metrics are input into a classifier that makes the liveness decision. This approach is different from conventional approaches where the classifier operates without using any relative (or "differential") metrics.

The disclosed embodiments have major advantages because they take into account deviations from a known live finger. As a simplified example, assume a live finger has a low variance of gray levels along its finger ridges. Classifying on an absolute scale, this likely means the liveness is low, and that on a verification attempt a live finger might be classified erroneously as a spoof, adding to the FRR (false reject rate) of the system. Further assume a spoof finger is seen that has an even lower variance. Using the absolute method, such an attempt is also called a spoof, but this time correctly so. Using a relative method, as disclosed herein, any live finger with similar variance to the finger used during enrollment would be correctly determined to be a live finger. But a spoof with even less variance can still be detected as a spoof because it deviated far enough away from the normal baseline.

Turning to the figures, FIG. 1 is a block diagram of an example of an electronic device 100 that includes a sensor device 102 and a processing system 104, according to an embodiment. By way of example, basic functional components of the electronic device 100 utilized during capturing, storing, and validating a biometric match attempt are illustrated. The processing system 104 includes a processor(s) 106, a memory 108, a template storage 110, an operating system (OS) 112, and a power source(s) 114. Each of the processor(s) 106, the memory 108, the template storage 110, and the operating system 112 are interconnected physically, communicatively, and/or operatively for inter-component communications. The power source 114 is interconnected to the various system components to provide electrical power as necessary.

As illustrated, processor(s) 106 are configured to implement functionality and/or process instructions for execution within electronic device 100 and the processing system 104. For example, processor 106 executes instructions stored in memory 108 or instructions stored on template storage 110 to identify a biometric object or determine whether a biometric authentication attempt is successful or unsuccessful. Memory 108, which may be a non-transitory, computer-readable storage medium, is configured to store information within electronic device 100 during operation. In some embodiments, memory 108 includes a temporary memory, an area for information not to be maintained when the electronic device 100 is turned off. Examples of such temporary memory include volatile memories such as random access memories (RAM), dynamic random access memories (DRAM), and static random access memories (SRAM). Memory 108 also maintains program instructions for execution by the processor 106.

Template storage 110 comprises one or more non-transitory computer-readable storage media. In the context of a fingerprint sensor, the template storage 110 is generally configured to store enrollment views for fingerprint images for a user's fingerprint or other enrollment information. The enrollment views can include multiple images of the same finger. Further, the enrollment views can include view of multiple different fingers of the user. More generally, the template storage 110 may be used to store information about an object. The template storage 110 may further be configured for long-term storage of information. In some examples, the template storage 110 includes non-volatile storage elements. Non-limiting examples of non-volatile storage elements include magnetic hard discs, solid-state drives (SSD), optical discs, floppy discs, flash memories, or forms of electrically programmable memories (EPROM) or electrically erasable and programmable (EEPROM) memories, among others.

The processing system 104 also hosts an operating system (OS) 112. The operating system 112 controls operations of the components of the processing system 104. For example, the operating system 112 facilitates the interaction of the processor(s) 106, memory 108 and template storage 110. The processing system 104, although shown as including a processor 106 and memory 108, may further include a microprocessor, microcontroller and/or dedicated circuitry.

According to various embodiments, the processor(s) 106 implement hardware and/or software to obtain data describing an image of an input object. The processor(s) 106 may also align two images and compare the aligned images to one another to determine whether there is a match. The processor(s) 106 may also operate to reconstruct a larger image from a series of smaller partial images or sub-images, such as fingerprint images when multiple partial fingerprint images are collected during a biometric process, such as an enrollment or matching process for verification or identification.

The processing system 104 includes one or more power sources 114 to provide power to the electronic device 100. Non-limiting examples of power source 114 include single-use power sources, rechargeable power sources, and/or power sources developed from nickel-cadmium, lithium-ion, or other suitable material as well power cords and/or adapters which are in turn connected to electrical power.

Sensor device 102 can be implemented as a physical part of the electronic device 100, or can be physically separate from the electronic device 100. As appropriate, the sensor device 102 may communicate with parts of the electronic device 100 using any one or more of the following: buses, networks, and other wired or wireless interconnections. In some embodiments, sensor device 102 is implemented as a fingerprint sensor to capture a fingerprint image of a user. In accordance with the disclosure, the sensor device 102 uses optical sensing for the purpose of object imaging including imaging biometrics such as fingerprints. The sensor device 102 can be incorporated as part of a display, for example, or may be a discrete sensor. In some embodiments, the sensor device 102 may perform optical imaging. In various other embodiments, the sensor device 102 can be replaced with a capacitive sensor device, ultrasonic sensor device, or another sensor device that uses some other sensing technology for object imaging, as described in greater detail herein.

The electronic device 100 may utilize any suitable combination of sensor components and sensing technologies to detect user input in the sensing region. Some implementations utilize arrays or other regular or irregular patterns of multiple sensing elements to detect the input. Example sensing techniques that the electronic device 100 may use include capacitive sensing techniques, optical sensing techniques, acoustic (e.g., ultrasonic) sensing techniques, pressure-based (e.g., piezoelectric) sensing techniques, resistive sensing techniques, thermal sensing techniques, inductive sensing techniques, elastive sensing techniques, magnetic sensing techniques, and/or radar sensing techniques.

For example, the electronic device 100 may use resistive sensing techniques where contact from an input object closes an electrical circuit and can be used to detect input. In one example technique, the sensor device 102 includes a flexible and conductive first layer separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine spatial information corresponding to the input object.

In another example, the electronic device 100 may use inductive sensing techniques where one or more sensing elements pick up loop currents induced by a resonating coil or pair of coils. Some combination of the magnitude, phase, and frequency of the currents may then be used to determine spatial information corresponding to the input object.

In another example, the electronic device 100 may use acoustic sensing techniques where one or more acoustic sensing elements detect sound waves from nearby input objects. The sound waves may be in audible frequencies or ultrasonic frequencies. The detected sound waves may include echoes of ambient sound waves and/or echoes of sound waves emitted by the input device that are reflected from surfaces of the input object. Some combination of the amplitude, phase, frequency, and or time delay of the electrical signals may be used to determine spatial information corresponding to the input object.

One example acoustic sensing technique utilizes active ultrasonic sensing to emit high frequency source waves that propagate to the sensing region. One or more ultrasonic transmitter elements (also "ultrasonic emitters") may be used to emit high frequency sound waves to the sensing region, and one or more ultrasonic receiving elements (also "ultrasonic receivers") may detect echoes of the emitted sound waves. Separate elements may be used to transmit and receive, or common elements that both transmit and receive may be used (e.g., ultrasonic transceivers). In some instances, emitted ultrasonic waves are able to penetrate sub-surfaces of the input object, such as dermal layers of a human finger.

In another example, the electronic device 100 may use optical sensing techniques where one or more sensing elements detect light from the sensing region. The detected light may be reflected from the input object, transmitted through the input object, emitted by input object, or some combination thereof. The detected light may be in the visible or invisible spectrum (such as infrared or ultraviolet light). Example optical sensing elements include photodiodes, CMOS image sensor arrays, CCD arrays, thin-film detectors, and other suitable photosensors sensitive to light in wavelength(s) of interest. Active illumination may be used to provide light to the sensing region, and reflections from the sensing region in the illumination wavelength(s) may be detected to determine input information corresponding to the input object.

One example optical technique utilizes direct illumination of the input object, which may or may not be in contact with an input surface of the sensing region depending on the configuration. One or more light sources and/or light guiding structures are used to direct light to the sensing region. When an input object is present, this light is reflected directly from surfaces of the input object, which reflections can be detected by the optical sensing elements and used to determine input information about the input object.

Another example optical technique utilizes indirect illumination based on internal reflection to detect input objects in contact with an input surface of the sensing region. One or more light sources are used to direct light in a transmitting medium at an angle at which it is internally reflected at the input surface of the sensing region, due to different refractive indices at opposing sides of the interface defined by the input surface. Contact of the input surface by the input object causes the refractive index to change across this boundary, which alters the internal reflection characteristics at the input surface. Higher contrast signals can often be achieved if principles of frustrated total internal reflection (FTIR) are used to detect the input object, where the light is directed to the input surface at an angle of incidence at which it is totally internally reflected, except at locations where the input object is in contact and causes the light to scatter and partially transmit across this interface at the region of contact by the input object. An example of this is presence of a finger introduced to an input surface defined by a glass to air interface. The higher refractive index of human skin compared to air causes light incident at the input surface at the critical angle of the interface to air to be partially transmitted across the input interface and scattered by the finger, where it would otherwise be totally internally reflected at the glass to air interface. This optical response can be detected by the system and used to determine spatial information. In some embodiments, this can be used to image small scale surface variations of the input object, such as fingerprint patterns, where the internal reflectivity of the incident light differs depending on whether a ridge or valley of the finger is in contact with that portion of the input surface.

In another example, the electronic device 100 may use capacitive techniques where voltage or current is applied to create an electric field. Nearby input objects cause changes in the electric field, and produce detectable changes in capacitive coupling that may be detected as changes in voltage, current, or the like. Sensor electrodes may be utilized as capacitive sensing elements. Arrays or other regular or irregular patterns of capacitive sensing elements may be used to create electric fields. Separate sensor electrodes may be ohmically shorted together to form larger sensing elements.

One example technique utilizes "self capacitance" (or "absolute capacitance") sensing methods based on changes in the capacitive coupling between sensor electrodes and an input object. An input object near the sensor electrodes alters the electric field near the sensor electrodes, thus changing the measured capacitive coupling. An absolute capacitance sensing method may operate by modulating sensor electrodes with respect to a reference voltage (e.g. system ground), and by detecting the capacitive coupling between the sensor electrodes and the input object. For example, the sensing element array may be modulated, or a drive ring or other conductive element that is ohmically or capacitively coupled to the input object may be modulated. The reference voltage may by a substantially constant voltage or a varying voltage, or the reference voltage may be system ground.

Another example technique utilizes "mutual capacitance" (or "transcapacitance") sensing methods based on changes in the capacitive coupling between sensor electrodes. An input object near the sensor electrodes may alter the electric field between the sensor electrodes, thus changing the measured capacitive coupling. A transcapacitive sensing method may operate by detecting the capacitive coupling between one or more transmitter sensor electrodes (also "transmitter electrodes") and one or more receiver sensor electrodes (also "receiver electrodes"). Transmitter sensor electrodes may be modulated relative to a reference voltage to transmit transmitter signals. Receiver sensor electrodes may be held substantially constant relative to the reference voltage to facilitate receipt of resulting signals. The reference voltage may by a substantially constant voltage or system ground. The transmitter electrodes are modulated relative to the receiver electrodes to transmit transmitter signals and to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive. Also, sensor electrodes may be dedicated transcapacitance sensing elements or absolute capacitance sensing elements, or may be operated as both transcapacitance and absolute capacitance sensing elements.

Some non-limiting examples of electronic devices 100 include personal computers of all sizes and shapes, such as desktop computers, laptop computers, netbook computers, tablets, web browsers, e-book readers, and personal digital assistants (PDAs). Additional example electronic devices 100 include composite input devices, such as physical keyboards and separate joysticks or key switches. Further example electronic devices 100 include peripherals such as data input devices (including remote controls and mice) and data output devices (including display screens and printers). Other examples include remote terminals, kiosks, video game machines (e.g., video game consoles, portable gaming devices, and the like), communication devices (including cellular phones, such as smart phones), and media devices (including recorders, editors, and players such as televisions, set-top boxes, music players, digital photo frames, and digital cameras).

Figure 2:
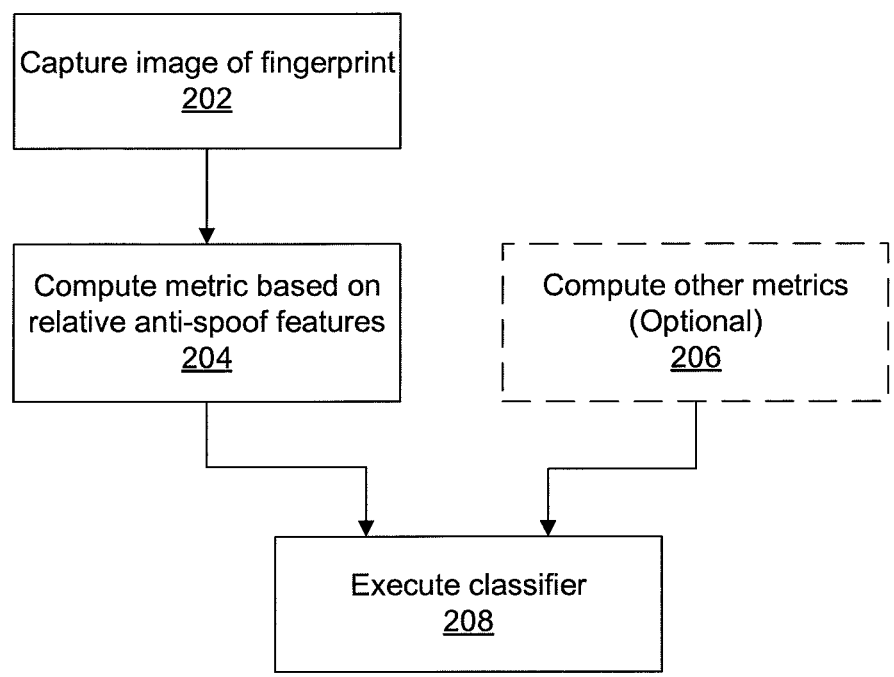
FIG. 2 is a block diagram illustrating a system and method for spoof detection according to an embodiment.

FIG. 2 is a block diagram illustrating a system and method for spoof detection according to an embodiment. At step 202, a sensor captures an image of a fingerprint. The fingerprint can be either from a live finger or a spoofed finger. At step 204, a processor computes a spoof detection metric based on relative anti-spoof features, as described in greater detail below. One or more metrics may be computed at step 204. The one or more metrics computed at step 204 are passed to a classifier. Optionally, at step 206, the processor may compute other spoof detection metrics and also pass them to the classifier. At step 208, the processor executes the classifier to determine whether the image of the fingerprint captured at step 202 is from a live finger or a spoofed finger.

Figure 3:
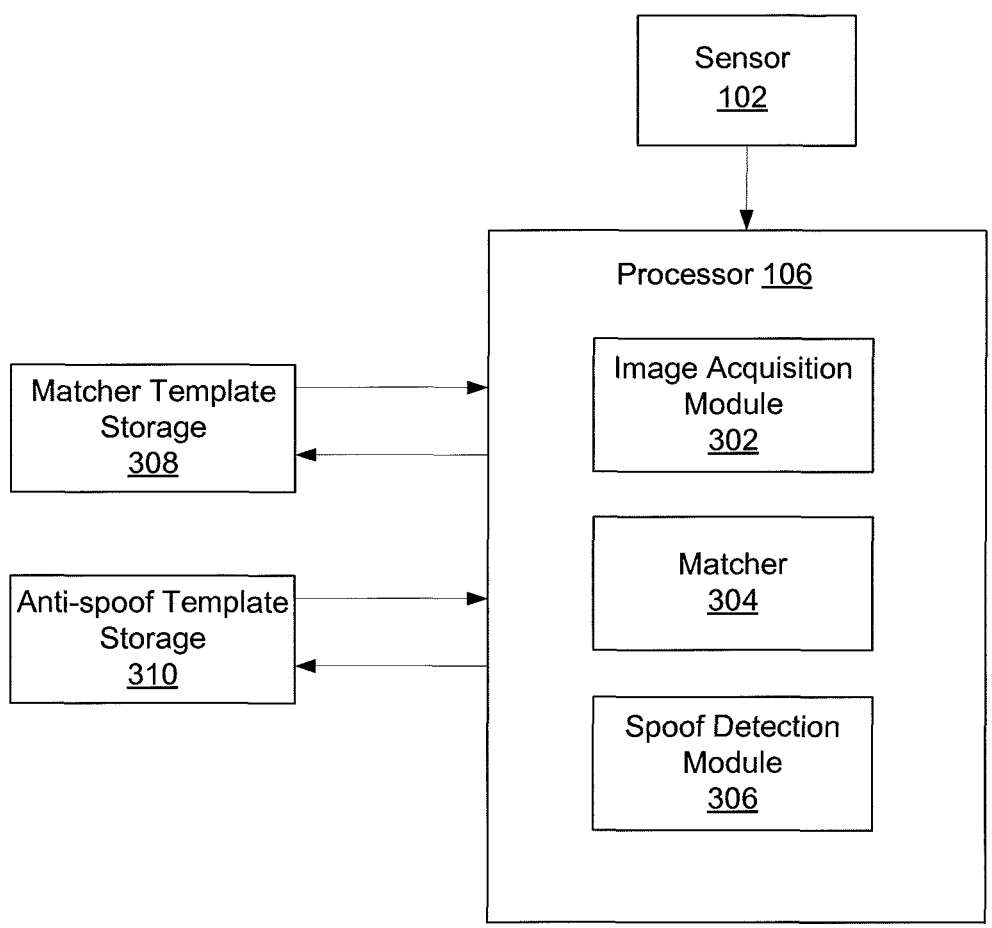
FIG. 3 is a block diagram of a spoof detection system, according to an embodiment.

FIG. 3 is a block diagram of a spoof detection system, according to an embodiment. The system includes a sensor device 102 and a processor 106. The processor 106 is configured to execute one or more software functional blocks, including an image acquisition module 302, a matcher 304, and a spoof detection module 306. The image acquisition module 302, the matcher 304, and the spoof detection module 306 are implemented as software instructions stored in a memory and executed by one or more processors 106.

Although shown as separate function blocks in FIG. 3, two or more of the image acquisition module 302, the matcher 304, and the spoof detection module 306 may be executed together as a single software module, application, or operating system. Alternatively, the image acquisition module 302, the matcher 304, and the spoof detection module 306 may be executed separately and/or provided by different software vendors. Also, in some embodiments, multiple processors 106 may be used to execute one or more of the image acquisition module 302, the matcher 304, and the spoof detection module 306.

In some embodiments, an input image, such as a fingerprint image, is captured by the sensor device 102. The input image is passed to the image acquisition module 302, which determines whether the image is an enrollment image or a verification image. If the input image is an enrollment image, a template associated with the input image is stored in the matcher template storage 308 and/or the matcher template storage 308 is updated based on the new input image.

If the input image is a verification image, the image acquisition module 302 also passes the input image to the matcher 304, which is configured to determine whether the input image matches any of the enrollment images stored in the matcher template storage 308. In one implementation, the matcher 304 may compare the input image to the enrollment image to determine a difference between the images. In some embodiments, if the difference is below a threshold, a match is found; otherwise, there is no match. In other embodiments, various techniques other than a comparison to a threshold can be used to determine whether the input image is a match to any of the enrollment images. Many different techniques can be used to execute the matcher 304, including point-based techniques, ridge-based techniques, or a combination of point-based and ridge-based techniques.

In some embodiments, for enrollment images, the image acquisition module 302 also passes the input image to the spoof detection module 306, which extracts anti-spoof metrics from the input image. Example anti-spoof metrics include: an average gray level of ridges, an average gray level of valleys, one or more values as to whether the input image includes blurred areas, one or more values as to whether the input image includes relative lighter areas, one or more values as to whether the input image includes relative darker areas, texture information (for example, by computing LBP (linear binary patterns) on portions of the input image, among others. In some implementations, anti-spoof metrics are generally global features of the input image that do not include location information. Also, in some implementations, anti-spoof metrics may not be discerning enough to provide adequate fingerprint matching results, i.e., since many spoofed images could satisfy a matcher that relied solely on anti-spoof metrics for matching.

The anti-spoof metrics extracted from the input image by the spoof detection module 306 may be stored in an anti-spoof template in the anti-spoof template storage 310. As described in detail herein, the metrics extracted from the input image can be combined with the anti-spoof metrics in the anti-spoof template, for example by averaging the metrics extracted from the input image and the anti-spoof metrics in the anti-spoof template, to generate an updated anti-spoof template.

In one implementation, the matcher template storage 308 and the anti-spoof template storage 310 comprise one storage device. In another implementation, the matcher template storage 308 and the anti-spoof template storage 310 comprise separate storage devices.

In addition, in one implementation, when a user is enrolling enrollment images, the same images are used for updating the matcher template storage 308 and the anti-spoof template storage 310. In other implementations, separate enrollment processes are used to update the matcher template storage 308 and the anti-spoof template storage 310. As such, a given enrollment image could be used to update just one or both of the matcher template storage 308 and the anti-spoof template storage 310.

In some embodiments, if the matcher 304 does not find a match in the matcher template storage 308, then the matcher 304 takes an appropriate action, such as, for example, denying entry to a mobile device. If the matcher 304 finds a match, then the spoof detection module 306 is configured to determine whether the input image is a spoof of a live finger, i.e., whether image is that of a real live finger or another non-derma-based material, such as gelatin or wood glue.

In some embodiments, the spoof detection module 306 is executed as part of the matcher 304. In other embodiments, the spoof detection module 306 is executed separately from the matcher 304.

In some embodiments, the spoof detection module 306 is executed after the matcher 304 finds a positive match. In other embodiments, the spoof detection module 306 is executed before the matcher 304 makes a match/non-match decision. In still further embodiments, the spoof detection module 306 and the matcher 304 are executed in parallel.

As described in greater detail herein, the spoof detection module 306 is configured to retrieve the anti-spoof template from the anti-spoof template storage 310 and compute differential metrics for the input image relative to the anti-spoof template. The differential metrics are passed to a classifier that makes the anti-spoof decision.

Figure 4:
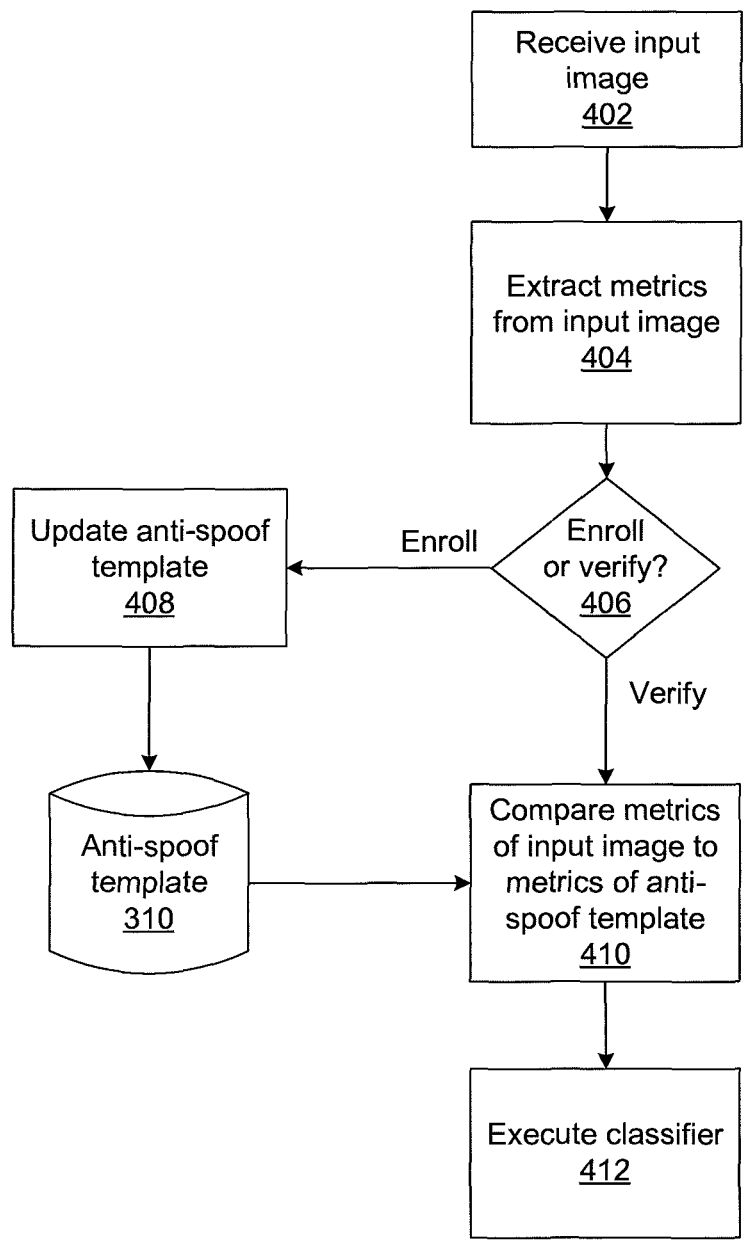
FIG. 4 is a flow diagram illustrating method steps for performing spoof detection based on relative metrics, according to an embodiment.

FIG. 4 is a flow diagram illustrating method steps for performing spoof detection based on relative metrics, according to an embodiment. In one embodiment, the method in FIG. 4 is implemented by the spoof detection module 306 in FIG. 3.

As shown in FIG. 4, at step 402, a processor receives an input image. In one implementation, the input image is an image of a fingerprint, although it will be understood that the method applies to images of other biometrics as well. The input image can be either an enrollment image or a verification image.

At step 404, the processor extracts one or more anti-spoof metrics from the input image. In one implementation, the anti-spoof metrics are extracted using software that analyzes the input image and performs various computations. In other implementations, the anti-spoof metrics are extracted using hardware, such as for example using hardware in an image sensor that captured the input image.

At step 406, the processor determines whether the input image is an enrollment image or a verification image. If the processor determines that the input image is an enrollment image, then at step 408, the processor updates an anti-spoof template 310 with the one or more anti-spoof metrics extracted from the input image.

In one embodiment, updating the anti-spoof template comprises computing, for each metric, an average of values for the metric across all enrollment images, including the input image. For example, say there are ten different anti-spoof metrics that are extracted from the input image, each having a value. Let us assume also that there are four prior enrollment images for the user and the current input image is the fifth enrollment image for the user. The anti-spoof metrics from the prior four enrollment images have been previously combined into the anti-spoof template. Once the current fifth enrollment image in encountered, the anti-spoofed metrics from the fifth enrollment image are averaged together with the anti-spoofed metrics from the four prior enrollment images.

In another embodiment, instead of computing an average for each anti-spoof metric, updating the anti-spoof template comprises computing a median for each metric across the several enrollment images including the input image. In yet another embodiment, updating the anti-spoof template comprises computing a range for each metric across the several enrollment images including the input image.

Returning to step 406, if the processor determines that the input image is a verification image, at step 410, the processor compares the anti-spoof metrics of the input image to the anti-spoof metrics of the anti-spoof template 310. In one implementation, for each metric, the processor computes a difference value (or "differential" value) between a value of a given anti-spoof metric in the input image and a corresponding value of the given anti-spoof metric in the anti-spoof template 310. These difference values are then passed to the classifier.

At step 412, the processor executes the classifier to make a spoof decision. In one embodiment, the classifier is configured to make a spoof decision as to whether the input image is of a real finger or of a spoofed finger. In another embodiment, the classifier is configured to generate an anti-spoof score and return the anti-spoof score to another entity within the anti-spoof module that makes the spoof/non-spoof decision, e.g., by comparing the anti-spoof score to a threshold. For example, the spoof/non-spoof decision can be made elsewhere in the system, such as by the anti-spoof module 302, or by an upstream logic module (not shown) that calls the anti-spoof module 302 and the matcher 304.

The classifier may be implemented as a neural network, but any classifier is within the scope of the disclosure. The classifier itself can be developed using machine learning methods, where a training set and a test set are created to train and validate the classifier performance. As described, the metrics input into the classifier are differential metrics.

In addition, in some implementations, other metrics unrelated to differential metrics computed using the method of FIG. 4 can also be input into the classifier, and the classifier is configured to compute an overall liveness score based on the combination of metrics.

Also, in some embodiments, the match/non-match decision of the matcher is made by a classifier associated with the matcher, which is the same classifier that makes the spoof/non-spoof decision. In other embodiments, the match/non-match decision is made by a different classifier than the classifier that makes the spoof/non-spoof decision.

Figure 5:
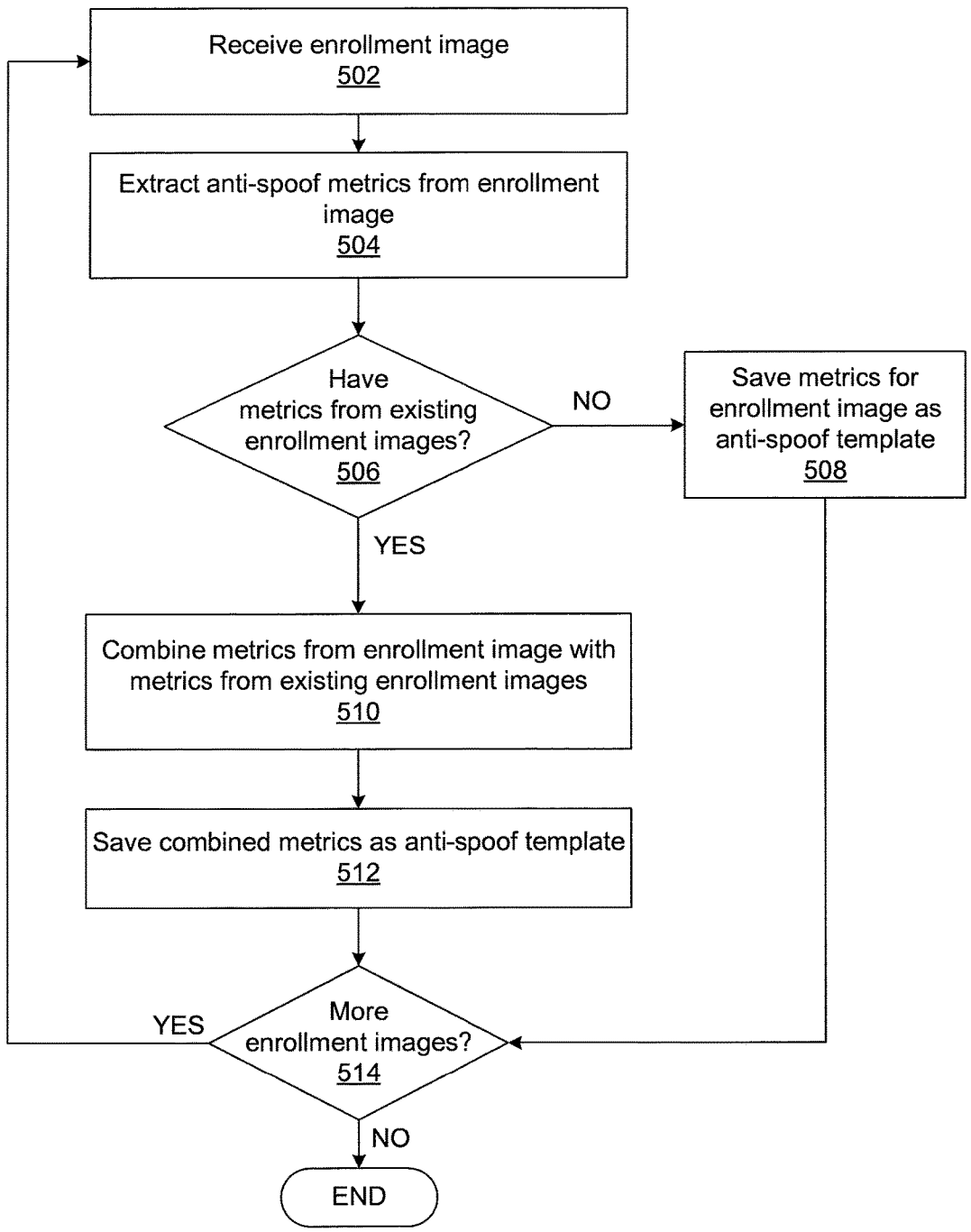
FIG. 5 is a flow diagram illustrating method steps for creating and updating an anti-spoof template, according to an embodiment.

FIG. 5 is a flow diagram illustrating method steps for creating and updating an anti-spoof template, according to an embodiment. In one embodiment, the method in FIG. 5 is implemented by the spoof detection module 306 in FIG. 3.

As shown, at step 502, a processor receives an enrollment image. At step 504, the processor extracts anti-spoof metrics from enrollment image. Steps 502 and 504 are similar to steps 402 and 404 in FIG. 4.

At step 506, the processor determines whether anti-spoof metrics have been extracted from any existing enrollment images. If not, then at step 508, the processor saves the metrics extracted from the enrollment image as a new anti-spoof template. This would occur, for example, on the very first enrollment image presented to the system.

If, at step 506, the processor determines that anti-spoof metrics have been extracted from existing enrollment images, then at step 510, the processor combines the anti-spoof metrics from the enrollment image received at step 502 with the anti-spoof metrics from the existing enrollment images. As described, combining the anti-spoof metrics may include, for each anti-spoof metric, computing an average, computing a median, or computing a range. Other statistical techniques for combing the anti-spoof metrics from the enrollment image with the anti-spoof metrics from the existing enrollment images are also within the scope of the disclosure. For example, combining the anti-spoof metrics may include updating a binary value indicative of whether a given anti-spoof feature is present in any of the enrollment images. Another example computes a histogram of the values for a given metric and determines a probabilistic range.

At step 512, the processor saves the combined metrics as an updated anti-spoof template. At step 514, the processor determines whether there are any more enrollment images to process. If yes, the method returns to step 502. If not, the method terminates.

Figure 6:
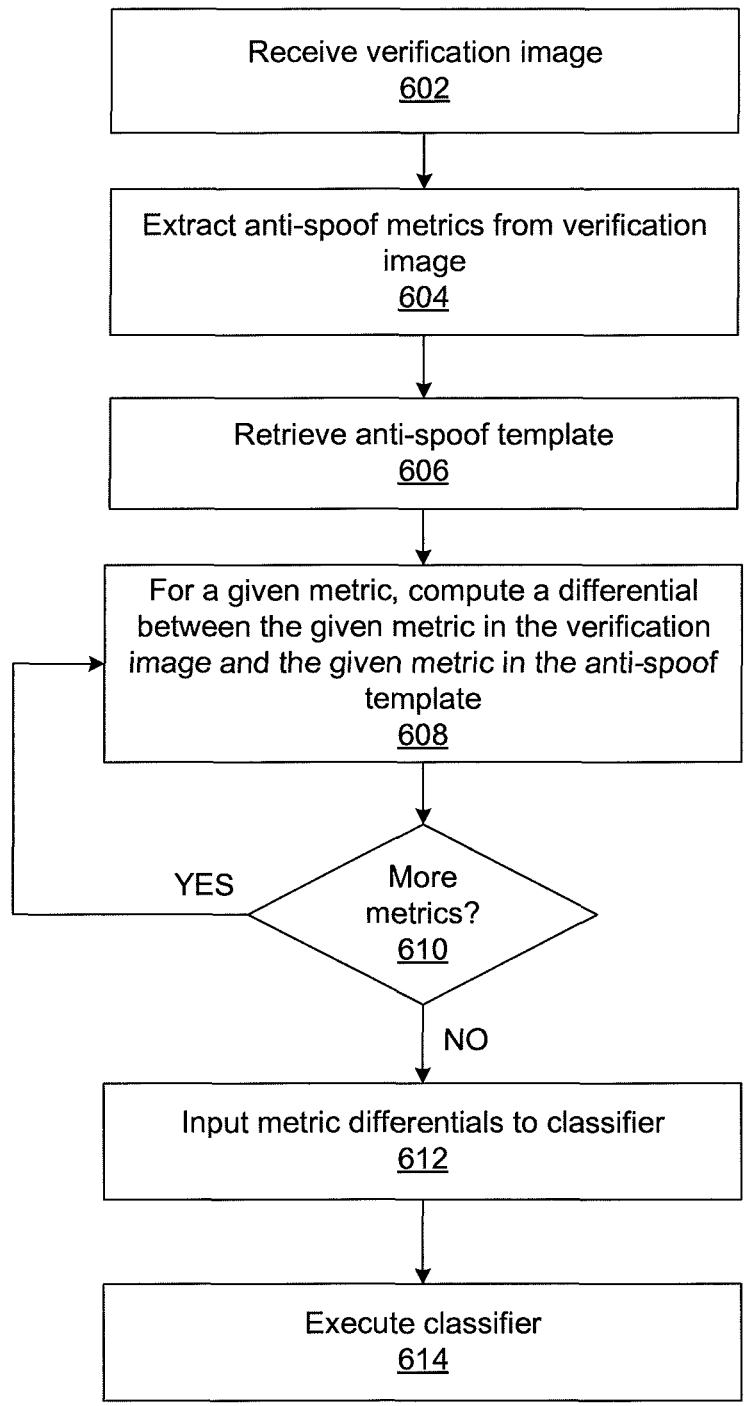
FIG. 6 is a flow diagram illustrating method steps for spoof detection based on one or more differential metrics, according to an embodiment.

FIG. 6 is a flow diagram illustrating method steps for spoof detection based on one or more differential metrics, according to an embodiment. In one embodiment, the method in FIG. 6 is implemented by the spoof detection module 306 in FIG. 3.

As shown, at step 602, a processor receives a verification image. At step 604, the processor extracts anti-spoof metrics from verification image. Steps 602 and 604 are similar to steps 402 and 404 in FIG. 4.

At step 606, the processor retrieves an anti-spoof template from an anti-spoof template storage (e.g., anti-spoof template storage 310). The anti-spoof template includes values for the various anti-spoof metrics that have been combined for the enrollment images for that particular user.

At step 608, for a given anti-spoof metric, the processor computes a differential value between a value of the given anti-spoof metric in the verification image and a value of the given anti-spoof metric in the anti-spoof template. For example, the differential value may be computed by subtracting the value of the given anti-spoof metric in the verification image from the value of the given anti-spoof metric in the anti-spoof template.

At step 610, the processor determines whether any more anti-spoof metrics remain to be analyzed. If yes, the method returns to step 608. If not, the method proceeds to step 612, where the processor inputs the differential values computed at step 608 for each anti-spoof metric to the classifier. At step 614, the processor executes the classifier to make a spoof decision, i.e., determine whether the input image is a replica of a biometric.

In sum, the disclosed embodiments make a liveness determination based on metrics (e.g., statistics) that are relative to metrics found in other images of that particular user's finger. The relative differences in the metrics are input into the classifier that makes the liveness decision. In some implementations, the disclosed approach provides better anti-spoof results than conventional approaches where the classifier operates independent of any relative (or "differential") metrics.

Although this invention describes optical object imaging in the context of fingerprint image sensing, the method and system may be used to image any object.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A device, comprising:
    a sensor configured to capture an input image of a biometric; and
    a processor configured to:
        receive, from the sensor, the input image;
        extract one or more anti-spoof metrics from the input image;
        receive an anti-spoof template corresponding to a biometric of a first user;
        for a first anti-spoof metric, compute a first amount of a difference between a value of the first anti-spoof metric extracted from the input image and a value of the first anti-spoof metric in the anti-spoof template that corresponds to the biometric of the first user;
        for a second anti-spoof metric extracted from the input image, compute a second amount of a difference between a value of the second anti-spoof metric extracted from the input image and a value of the second anti-spoof metric in the anti-spoof template that corresponds to the biometric of the first user;
        determine whether the input image is a replica of the biometric of the first user based on the first amount of the difference between the value of the first anti-spoof metric extracted from the input image and the value of the first anti-spoof metric in the anti-spoof template that corresponds to the biometric of the first user and the second amount of the difference between the value of the second anti-spoof metric extracted from the input image and the value of the second anti-spoof metric in the anti-spoof template that corresponds to the biometric of the first user; and
        prevent successful authentication on the device in response to determining that the input image is a replica of the biometric of the first user.

2. The device of claim 1, wherein the processor is further configured to:
    receive, from the sensor, one or more enrollment images of the biometric of the first user;
    extract one or more anti-spoof metrics from each of the one or more enrollment images; and
    generate the anti-spoof template based on the one or more anti-spoof metrics extracted from each of the one or more enrollment images.

3. The device of claim 2, wherein the one or more enrollment images comprises at least two enrollment images, and wherein generating the anti-spoof template comprises combining corresponding anti-spoof metrics extracted from each of the at least two enrollment images.

4. The device of claim 3, wherein the combining comprises computing, for each anti-spoof metric, an average value for the anti-spoof metric.

5. The device of claim 3, wherein the combining comprises computing, for each anti-spoof metric, a median value for the anti-spoof metric.

6. The device of claim 3, wherein the combining comprises computing, for each anti-spoof metric, a range of values for the anti-spoof metric extracted from each of the at least two enrollment images.

7. The device of claim 2, wherein the one or more enrollment images of the biometric of the first user are further stored in a matcher template storage, wherein the processor is configured to determine whether the input image is a match to one or more of the enrollment images separate from determining whether the input image is a replica of the biometric of the first user.

8. The device of claim 1, wherein the biometric of the first user comprises a fingerprint of a finger of the first user, and the replica comprises a gelatin mold, a graphite mold, or a wood glue mold of the fingerprint of the finger.

9. A method for performing spoof detection, comprising:
    receiving, by a processor from a sensor, an input image of a biometric;
    extracting, by the processor, one or more anti-spoof metrics from the input image;
    receiving, by the processor, an anti-spoof template corresponding to a biometric of a first user;
    for a first anti-spoof metric, computing, by the processor, a first amount of a difference between a value of the first anti-spoof metric extracted from the input image and a value of the first anti-spoof metric in the anti-spoof template that corresponds to the biometric of the first user;
    for a second anti-spoof metric extracted from the input image, computing, by the processor, a second amount of a difference between a value of the second anti-spoof metric extracted from the input image and a value of the second anti-spoof metric in the anti-spoof template that corresponds to the biometric of the first user;
    determining, by the processor, whether the input image is a replica of the biometric of the first user based on the first amount of the difference between the value of the first anti-spoof metric extracted from the input image and the value of the first anti-spoof metric in the anti-spoof template that corresponds to the biometric of the first user and the second amount of the difference between the value of the second anti-spoof metric extracted from the input image and the value of the second anti-spoof metric in the anti-spoof template that corresponds to the biometric of the first user; and preventing, by the processor, successful authentication on the device in response to determining that the input image is a replica of the biometric of the first user.

10. The method of claim 9, further comprising:

receiving, by the processor from the sensor, one or more enrollment images of the biometric of the first user;

extracting, by the processor, one or more anti-spoof metrics from each of the one or more enrollment images; and generating, by the processor, the anti-spoof template based on the one or more anti-spoof metrics extracted from each of the one or more enrollment images.

11. The method of claim 10, wherein the one or more enrollment images comprises at least two enrollment images, and wherein generating the anti-spoof template comprises combining corresponding anti-spoof metrics extracted from each of the at least two enrollment images.

12. The method of claim 11, wherein the combining comprises computing, for each anti-spoof metric, an average value for the anti-spoof metric.

13. The method of claim 11, wherein the combining comprises computing, for each anti-spoof metric, a median value for the anti-spoof metric.

14. The method of claim 11, wherein the combining comprises computing, for each anti-spoof metric, a range of values for the anti-spoof metric extracted from each of the at least two enrollment images.

15. The method of claim 10, wherein the one or more enrollment images of the biometric of the first user are further stored in a matcher template storage, wherein the processor is configured to determine whether the input image is a match to one or more of the enrollment images separate from determining whether the input image is a replica of the biometric of the first user.

16. The method of claim 9, wherein the biometric of the first user comprises a fingerprint of a finger of the first user, and the replica comprises a gelatin mold, a graphite mold, or a wood glue mold of the fingerprint of the finger.

17. A non-transitory computer-readable storage medium storing instructions that, when executed by a processor, causes a computing device to perform spoof detection, by performing steps comprising:

receiving, from a sensor, an input image of a biometric;

extracting one or more anti-spoof metrics from the input image;

receiving an anti-spoof template corresponding to a biometric of a first user;

for a first anti-spoof metric, computing a first amount of a difference between a value of the first anti-spoof metric extracted from the input image and a value of the first anti-spoof metric in the anti-spoof template that corresponds to the biometric of the first user;

for a second anti-spoof metric extracted from the input image, computing a second amount of a difference between a value of the second anti-spoof metric extracted from the input image and a value of the second anti-spoof metric in the anti-spoof template that corresponds to the biometric of the first user;

determining whether the input image is a replica of the biometric of the first user based on the first amount of the difference between the value of the first anti-spoof metric extracted from the input image and the value of the first anti-spoof metric in the anti-spoof template that corresponds to the biometric of the first user and the second amount of the difference between the value of the second anti-spoof metric extracted from the input image and the value of the second anti-spoof metric in the anti-spoof template that corresponds to the biometric of the first user; and preventing successful authentication on the device in response to determining that the input image is a replica of the biometric of the first user.

18. The computer-readable storage medium of claim 17, wherein one or more enrollment images of the biometric of the first user are further stored in a matcher template storage, and wherein the processor is configured determine whether the input image is a match to one or more of the enrollment images separate from determining whether the input image is a replica of the biometric of the first user.

* * * * *